United States Patent [19]
MacKenzie et al.

[11] Patent Number: 5,830,547
[45] Date of Patent: Nov. 3, 1998

[54] PEEL-OPEN PACKAGE

[75] Inventors: Fiona MacKenzie, Bloomington, Minn.; Roy Christopherson, Swindon; David Stell, Bristol, both of United Kingdom

[73] Assignee: Rexam Medical Packaging, Inc., Vernon Hills, Ill.

[21] Appl. No.: 678,984

[22] Filed: Jul. 12, 1996

[51] Int. Cl.⁶ .................................................. B29D 22/00
[52] U.S. Cl. ...................... 428/36.1; 428/36.5; 206/363; 206/439
[58] Field of Search .................. 428/35.8, 36.5, 428/35.7, 36.1; 206/363, 439

[56] References Cited

U.S. PATENT DOCUMENTS

| | | |
|---|---|---|
| 3,891,089 | 6/1975 | Goodwin et al. . |
| 4,194,622 | 3/1980 | Lewis . |
| 4,361,237 | 11/1982 | Heiremans et al. . |
| 4,367,312 | 1/1983 | Bontinck et al. . |
| 4,859,514 | 8/1989 | Friedrich et al. . |
| 4,956,212 | 9/1990 | Bekele . |
| 5,033,252 | 7/1991 | Carter . |
| 5,324,555 | 6/1994 | Hughart et al. . |
| 5,346,735 | 9/1994 | Logan et al. . |
| 5,516,583 | 5/1996 | Zhang et al. . |
| 5,626,929 | 5/1997 | Stevenson ............................. 428/35.8 |

FOREIGN PATENT DOCUMENTS

| | | |
|---|---|---|
| 2191764 | 2/1996 | Canada . |
| 0 024 270 | 2/1981 | European Pat. Off. . |
| 0 042 831 | 12/1981 | European Pat. Off. . |
| 0 785 066 | 7/1997 | European Pat. Off. . |
| 7144391 | 6/1995 | Japan . |
| 07205562 | 3/1997 | Japan . |
| 96/04861 | 2/1996 | WIPO . |

OTHER PUBLICATIONS

European Patent Office, International Search Report for PCT/IB 97/00862, completed Oct. 27, 1997 by P. Olle.

"Coated Vs. Uncoated Webs In Thermoform/Fill/Seal"; Randall D. Brinkman; *Paper Film Foil Conv.* 1984, 58, No. 10, Oct. 19, 1984; pp. 78–82.

*Primary Examiner*—Christopher Raimund
*Attorney, Agent, or Firm*—Bell Seltzer Intellectual Property Law Group of Alston & Bird LLP

[57] ABSTRACT

A peel-open package includes a polymeric film, a lid adhered to the polymeric film along a continuous portion thereof and a product encapsulated between the polymeric film and lid material. The polymeric film is typically a coextruded multiple layer film having a sealable layer and at least one base layer. The sealable layer comprises an ethylene copolymer derived from at least one monomer selected from the group consisting of vinyl acetate and alkylacrylates, a talc additive, and an additive which provides peelability to the heat seal layer. The lid material is preferably a microporous layer to allow sterilization and prevent subsequent contamination by bacteria and other microbial organisms. The peel-open package provides a good seal range for uncoated Tyvek®, evidence of seal integrity, reduced Tinting, and a seal strength which is sufficiently low to prevent the delaminating or branching of the lid material when it is removed. The present invention also includes methods of making peel-open packages.

20 Claims, 1 Drawing Sheet

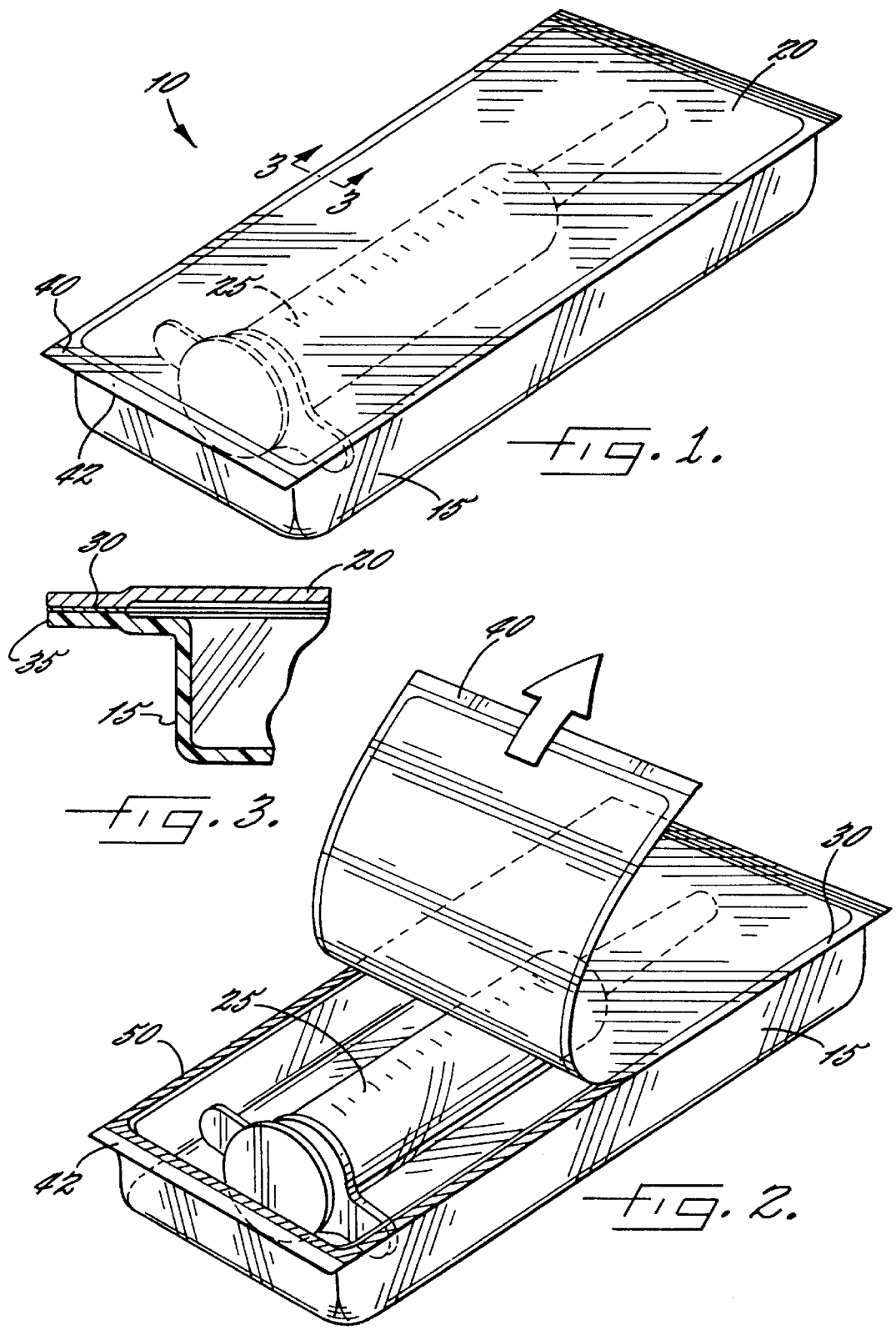

PEEL-OPEN PACKAGE

FIELD OF THE INVENTION

The present invention relates to primary packaging, particularly, form, fill and seal packaging. More particularly, the present invention relates to peel-open, sterile packaging.

BACKGROUND OF THE INVENTION

Medical, food and other packaging manufacturers offer a variety of products in peel-open packages. Often these packages are of the type referred to as form, fill and seal (FFS) packages. With FFS packages, a blown or cast thermoplastic film or sheet is typically formed into a desired package shape. The thermoplastic film is then filled with the packaged product, after which a lid material is sealed to the plastic film to envelop the packaged product.

One common method of sealing the thermoplastic film to the lid is to apply heat and pressure to a continuous portion of the film thereby causing a heat sealable composition in the thermoplastic film to form an adhesive bond between the lid and the thermoplastic film. One traditional heat sealable composition used with thermoplastic films is ethylene vinyl acetate copolymer (EVA). For example, U.S. Pat. No. 3,891,089 to Goodwin et al. and U.S. Pat. No. 4,956,212 to Bekele describe heat seal layers consisting essentially of EVA. Although EVA provides an adhesive, heat-sealable layer, the seal strength of the EVA may be greater than the strength of the lid material thus possibly causing the lid material to delaminate in an undesired fashion when the package is being peeled open. In addition, branching may occur such that fibers continue to extend across the polymeric film after the lid has been removed thus providing an obstacle to the removal of the product packaged therein.

Another problem which occurs with high seal strength packages is that the sealed area may exhibit linting, i.e., exhibit the release of small particles of lid material, when the package is opened. Linting can especially be a problem in a sterile environment such as an operating room where the fibers can come into contact with a patient.

In addition to the problems described above, the heat seal composition used may result in other problems when the package is peeled open. Specifically, the film material may be subject to stringing, i.e., the formation of polymeric filaments on the surface of the film.

These problems are further compounded by the lid materials used in the area of medical packaging. In medical packaging, the lid material is often a microporous web which allows the products being packaged to be sterilized. For example, a microporous non-woven spunbonded polyolefin substrate such as Tyvek® or a medical grade kraft paper may be used as the lid material. Preferably, when Tyvek® is used, the Tyvek® is uncoated because it is a less expensive alternative than using adhesive coated Tyvek®. Nevertheless, the seal range, i.e., the range of heat seal temperatures yielding a desired heat seal strength, is small for heat seals between uncoated Tyvek® and thermoplastic films, thus limiting the temperature range at which the lid material can be heat bonded to form a peel-open package. In addition, Tyvek® is highly susceptible to delaminating or linting when the heat seal strength between the Tyvek® and the lid material is too strong.

Therefore, there is a definite need to provide a heat seal composition which can be used with uncoated Tyvek® without experiencing the problems discussed above. U.S. Pat. No. 5,033,252 to Carter describes a method of sealing Tyvek® to a blister pack material which allows the package contents to be steam sterilized without adversely affecting the package seal. Nevertheless, Carter does not address heat seal compositions for sealing uncoated Tyvek® to a thermoplastic film and therefore fails to address the seal ranges and the problems associated with heat sealing uncoated Tyvek®.

In addition to providing an easily openable seal, heat seals preferably should provide evidence of seal integrity to allow the user to be confident that the seal remained intact prior to opening of the peel-open package. This evidence is particularly helpful in the medical industry where the product user must be confident that the packaged product is sterile. U.S. Pat. No. 5,324,555 to Hughart et al. describes a heat seal containing coextruded layers of high density polyethylene (HDPE), EVA, and polyionomer blended with low density polyethylene (LDPE) which exhibits a frosty appearance in the sealed area when opened to allow the user to be confident of the integrity of the package seal. Nevertheless, Hughart et al. is not directed to heat seal compositions for uncoated Tyvek®.

OBJECT and SUMMARY OF THE INVENTION

Therefore, it is an object of the present invention to provide a peel-open package which can be sterilized without adversely affecting the package seal.

It is a further object of the present invention to provide a peel-open package in which the lid material may be removed from the film without delaminating or linting of the lid material or stringing of the polymeric film material.

It is a further object of the present invention to provide evidence of the integrity of the heat seal to insure the sterilization of the packaged product.

It is a further object of the present invention to provide a polymeric film for a peel-open package which will adhere to an uncoated spunbonded nonwoven polyolefin web over a broad range of temperatures.

The present invention meets these objects by providing a peel-open package comprising a polymeric film comprising an ethylene copolymer derived from at least one monomer selected from the group consisting of vinyl acetate and alkylacrylates, a talc additive for providing uniform separation between the lid and the polymeric film and evidence of the integrity of the heat seal, and a peelability additive for interrupting the sealability of the ethylene copolymer to the lid to provide peelability to the polymeric film, and a lid adhered to the polymeric film along at least a portion thereof for encapsulating a product therebetween. Typically, the polymeric film is a coextruded multiple layer film having a sealable layer and at least one base layer and the sealable layer comprises the ethylene copolymer, talc additive and peelability additive described above.

In the preferred embodiment of the present invention, the lid material is microporous thus allowing the package contents to be sterilized. Preferably, the lid material is an uncoated spunbonded nonwoven polyolefin material such as Tyvek®. The uncoated spunbonded nonwoven polyolefin web is adhered to a sealable layer of a multilayer coextruded polymeric film by a heat and pressure activated seal which is generally adjacent to a peripheral edge of the polymeric film. The sealable layer comprises between about 45 and 95 percent by weight of an ethylene copolymer, greater than 0 to about 30 percent by weight of a talc additive, and between about 5 and 40 percent by weight of a peelability additive. The present invention also includes methods of making peel-open packages which meet these objects.

The resulting peel-open packages can easily be opened without causing delaminating, branching or linting of the lid material and without stringing of the polymeric film. The seal strength of the seal between the polymeric film and the lid material is between about 0.50 and 4.00 lb/in and can be formed over a relatively broad range of temperatures. The peel-open package can be sterilized and when the package is opened, the heat seal provides evidence of the integrity of the seal so the user can rely on the sterility of the packaged product.

These and other objects of the present invention will become more readily apparent upon consideration of the following detailed description and accompanying drawings which describe both the preferred and alternative embodiments of the invention.

BRIEF DESCRIPTION OF THE DRAWINGS

FIG. 1 is a perspective view of a peel-open package for a syringe according to the present invention.

FIG. 2 is a perspective view of a partially opened peel-open package according to the present invention and demonstrates evidence of seal integrity where the lid material was sealed to the polymeric film.

FIG. 3 is a sectional view of the peel-open package of FIG. 1 along line 3—3 illustrating the orientation of the package layers prior to opening.

DETAILED DESCRIPTION OF THE INVENTION

As illustrated in FIGS. 1–3, the peel-open package of the invention 10 comprises a polymeric film or sheet 15 and a lid 20 adhered to the film along a continuous portion thereof. A product 25 such as a syringe is encapsulated between the polymeric film 15 and the lid 20. Generally, the product 25 provided in the peel-open package 10 of the invention is of the class of products such as medical supplies which is sterilized prior to its ultimate use. The polymeric film 15 may be formed into a desired container shape for packaging the product 25.

The desired container shapes for the polymeric film 15 of the invention include but are not limited to blisters, trays, bags, and pouches. A "blister" as described herein refers to generally flexible polymeric films which have been formed into container shapes having a recessed center portion and a rim adjacent a peripheral edge of the film and continuously surrounding the recessed center portion. Typically, with blisters, the heat seal is formed between the lid 20 and polymeric film 15 along the rim surrounding the center portion of the container.

The term "tray" as used herein refers to containers having the same general shape as blisters. Trays differ from blisters, however, by being formed of a generally stiff material. The polymeric film 15 for both blisters and trays is generally formed into the desired container shapes by thermoforming the flat polymeric film.

The term "bag" as used herein refers to containers formed from flat films and having at least one fold. Typically, all but one of the nonfolded edges of the bag are sealed such as by applying heat and pressure to the nonfolded edges providing an opening along the one unsealed edge of the bag for insertion of a product 25. Once the product 25 has been inserted, a heat seal is formed between the polymeric film 15 and the lid material 20 adjacent a peripheral edge of the polymeric film 15 and preferably surrounding the unsealed edge of the polymeric film.

The term "pouch" as used herein refers to polymeric films which have not been folded or formed. Typically, the pouch is a flat polymeric film and is sealed to a lid material along a continuous portion of the film adjacent a peripheral edge of the polymeric film such as by applying heat and pressure thereto. The seal 30 although continuous is not complete, thereby forming a pocket in the pouch. A product 25 may be inserted into the pocket and the final edge sealed by applying heat and pressure to form the peel-open package 10 The polymeric film for bags and pouches is generally not thermoformed but used as a flat film.

In FIGS. 1–3, the polymeric film 15 has been thermoformed into a blister or tray. Nevertheless, one skilled in the art would appreciate that the polymeric film 15 may be formed into any of the container shapes described herein or other suitable shapes and may be of various sizes.

The lid 20 is adhered to the polymeric film 15 by a heat and pressure activated seal 30. The heat and pressure activated seal 30 is generally adjacent to a peripheral edge 35 of the polymeric film 15 and provides a border which surrounds the product 25 within the peel-open package 10. Although the border may be of any shape which surrounds the product 25, the seal border for the blister or tray illustrated in FIGS. 1–3 is generally rectangular.

In order to open the peel-open package 10 of the invention, the lid 20 is removed, typically by peeling it away from the polymeric film 15 to thereby provide access to the product 25 located therein. Pull tabs 40 and 42 or similar projections are preferably provided to enable the user to separately grip the lid 20 and polymeric film 15 so that the lid 20 can be easily peeled away from the polymeric film 15. As illustrated in FIG. 2, the lid 20 is peeled away from the polymeric film 15 without delaminating, branching or Tinting of the lid material and without stringing of the polymeric film 15.

One important feature of the invention is that once the lid 20 is removed, evidence 50 of the seal is provided which demonstrates the integrity of the seal 30. Because the package 10 generally contains a sterilized product 25, the ultimate user will typically expect to rely on the fact that the seal 30 has been maintained during shipment and that the sterilized object has not been contaminated. Once the lid 20 has been removed, the heat seal 30 exhibits a cloudy, milky-white appearance 50 where the seal was maintained to provide evidence of the integrity of the seal. If continuous evidence of seal integrity is present, the user may assume that the sterilized object was not contaminated during shipment. Therefore, the evidence 50 of seal integrity may provide the user with confidence of the sterility of the packaged object.

With respect to the preferred materials used in the peel-open packages described in the above preferred embodiment, the polymeric film 15 is preferably a thermoplastic film and comprises an ethylene copolymer, a talc additive, and a peelability additive. Preferably, the polymeric film is a coextruded multiple layer film having a sealable layer comprising the ethylene copolymer, talc additive, and peelability additive and at least one base layer. For instance, a three-layer polymeric film may be provided having a sealable layer and two base layers.

The ethylene copolymer used in the sealable layer of the present invention is preferably derived from at least one monomer selected from the group consisting of vinyl acetate (VA) and alkylacrylates. Exemplary alkylacrylates include methylacrylate (MA), ethylacrylate (EA), butylacrylate (BA) and the like. The preferred ethylene copolymers are ethylene vinyl acetate (EVA), ethylene methylacrylate (EMA), ethylene ethylacrylate (EEA), ethylene butylacrylate (EBA), or blends thereof, and are typically derived from the copolymerization of at least one ethylene monomer and at least one vinyl acetate or alkylacrylate monomer. Preferably, the ethylene copolymer in the sealable layer is derived from less than 30 percent by weight of vinyl acetate or alkylacrylate monomer. Although not preferred, low density polyethylene (LDPE) or linear low density polyethylene (LLDPE) may be used in the sealable layer without vinyl acetate or alkylacrylate included in the polymeric film. More preferably, the ethylene copolymer is derived from between about 2 and 20 percent by weight of vinyl acetate or alkylacrylate monomer. The vinyl acetate or alkylacrylate monomer used to form the ethylene copolymer decreases the melting temperature of the ethylene copolymer thus allowing the sealable layer to be melted at a lower temperature range.

The amount of ethylene copolymer in the sealable layer is sufficiently high to provide a seal between the lid 20 and polymeric film 15 but sufficiently low to incorporate the features provided by the talc additive and peelability additive. Therefore, the sealable layer generally comprises between about 45 and 95 percent by weight of ethylene copolymer including any polyethylene used in masterbatches as described below. Preferably, the heat seal layer comprises between about 70 and 80 percent by weight of ethylene copolymer.

In addition to the components described above, the ethylene copolymers of the invention may include various slip agents, anti-blocking agents, process aids, anti-oxidants, and the like. An exemplary ethylene copolymer is an EVA copolymer containing a silica anti-blocking agent, an anti-oxidant, and a slip agent.

In addition to the ethylene copolymer, the sealable layer generally contains a talc (hydrous magnesium silicate) additive. The talc additive may be provided in a masterbatch with polyethylene, e.g. a masterbatch of 50 percent talc and 50 percent polyethylene by weight such as product number 10799A from Ampacet Corp., or may be added in pure form. When a masterbatch is used, the amount of polyethylene contributes to the total amount of ethylene copolymer used in the sealable layer.

In the sealable layer the talc provides evidence of the integrity of the seal 30 and aids in the separation of the lid 20 from the polymeric film 15 in the peel-open package 10. When the lid 20 is separated from the polymeric film 15 the seal will exhibit a milky-white appearance 50 where the seal was present. As described above, the evidence of seal integrity provides the user with the security that the seal remained intact from the time the lid 20 and polymeric film 15 were sealed together until the actual opening of the package 10. If the heat seal evidence is neither milky-white nor continuous, the product 25 contained therein may not be sterile. The product 25 may then need to be resterilized or may be discarded and replaced by a product obtained from a package 10 having the desired heat seal evidence 50.

In addition to heat seal evidence, the talc in the sealable layer aids in the separation of the lid from the polymeric film. The talc will actually help to "cut away" the lid from the polymeric film thereby allowing easy removal of the lid material. This feature prevents the delaminating or branching of the lid material and stringing of the polymeric film 15 which may occur in conventional peel-open packages.

The amount of talc in the sealable layer is sufficiently high to provide the heat seal evidence and aid in separation of the lid 20 from the polymeric film 15 but sufficiently low to still provide the desired heat seal strength. Therefore, the sealable layer generally comprises between greater than 0 to about 30 percent by weight of talc and preferably between about 1 and 10 percent by weight of talc. In the event that a talc masterbatch containing polyethylene is used, the amount of polyethylene contributes to the amount of ethylene copolymer in the sealable layer. In addition, although not preferred, the sealable layer may form a suitable seal even without the talc additive.

The sealable layer further comprises an additive for interrupting the sealability of the ethylene copolymer to the lid 20 to provide peelability to the sealable layer. The peelability additive actually affects the seal strength of the seal 30, by its immiscibility with the ethylene copolymer in the sealable layer, thus preventing delaminating or branching of the lid material when it is removed. Exemplary peelability additives include polybutylene, polypropylene, polystyrene, polyterpene, styrene-butadiene copolymers such as K-resin from Phillips Petroleum Co., or any other additive which will reduce the seal strength of the seal 30 without adversely affecting the corresponding package 10. Polybutylene is the preferred peelability additive for the invention. It should be noted that although the combination of polypropylene and ionomer is a conventional method of forming a peelable heat seal, this particular combination is less preferred in the present invention. Preferably, the sealable layer contains no ionomer because the combination of polypropylene and ionomer may provide a heat seal layer which does not seal sufficiently to uncoated Tyvek® in the heat seal ranges of the invention.

The amount of the peelability additive in the sealable layer is sufficiently high to provide peelability to the heat seal 30 but sufficiently low to still provide the desired heat seal strength. Therefore, the sealable layer generally comprises between about 5 and 40 percent by weight of the peelability additive. Preferably, the sealable layer comprises between about 15 and 25 percent by weight of the peelability additive.

Accordingly, an exemplary sealable layer for the polymeric film 15 may contain 75 percent by weight of the ethylene copolymer, 5 percent by weight of the talc, and 20 percent by weight of the peelability additive.

Numerous materials may be used in the base layer(s) of the polymeric film. Exemplary base layer materials include polyolefins, nylons, polyvinylidene chloride, vinylidene chloride copolymers (e.g. saran), ethylene vinyl acetate (EVA) copolymer, ionomers, hydrolyzed EVA copolymer (EVOH), ethylene alkyl acrylate copolymers, blends thereof and the like. Preferably, polyolefins, ionomers, EVA copolymer or nylons are used in the base layer(s) of the invention. Preferably, the base layer is a material which prevents the packaged object from penetrating through the envelope and which prevents possible tear or delamination failure of the polymeric film 15 when the package is peeled open. Moreover, the base layer material may be either relatively flexible or stiff depending on the use of the package and the product to be packaged. For instance, a blister, bag or pouch may be relatively flexible whereas a tray may be relatively stiff.

The lid 20 of the present invention is typically a porous material and preferably a microporous material. "Microporous" material as used herein refers to material which is of a sufficiently low pore size to prevent penetration by bacteria and other microbial organisms but with sufficiently high pore size to allow gases and water vapor to pass through the pores. The preferred microporous material may be a spunbonded nonwoven polyolefin web material such as Tyvek® 1073B and Tyvek® 1059B, both manufactured by Dupont Co. Nevertheless, other microporous materials such as medical grade kraft paper may also be used. When Tyvek® is used, the Tyvek® is preferably uncoated because it is generally less expensive than adhesive coated Tyvek®.

With respect to the process of making the peel-open package 10 of the invention, typically the first step is extruding the polymeric film material. Preferably, the polymeric film 15 is a multiple layer material of two or more compositions which are coextruded to form the polymeric film. Typically, a sealable composition comprising the ethylene copolymer, talc additive, and peelability additive is provided in one extruder and at least one additional extruder is provided containing a base layer composition. The sealable composition and the base layer composition(s) advance through either a blown or cast die to form the multiple layer film or sheet. The sealable composition forms a sealable layer in the multiple layer film and the additional base layer composition(s) form the base layer(s) of the polymeric film 15. As will be understood by one skilled in the art, the sealable layer of the polymeric film 15 is provided as an outer layer of the polymeric film and in such a manner as to receive a product 25 and lid material 20. Once the polymeric film 15 is formed, it may be shaped into a desired container such as a blister or tray, or may be used as a flat polymeric film 15 as for a bag or pouch. If, for example, a blister or tray is to be used, the polymeric film 15 is preferably shaped by thermoforming the film material. This is typically accomplished in a forming station by providing heat and a pressure gradient such as by applying air pressure on one side of the film material and/or a vacuum on the other side of the film material.

In the case of, e.g., blisters or trays, once the polymeric film 15 has been shaped, the product 25 may be positioned on the sealable layer of the polymeric film 15. Once the product has been positioned on the sealable layer of the film 15, a lid 20 is typically applied to the sealable layer of the film. The lid 20 is then adhered to the polymeric film 15 by applying a heat and pressure activated seal 30 generally adjacent to a peripheral edge 35 of the polymeric film. This is provided by heating and applying pressure along a continuous portion of the coextruded film thus activating the sealable layer and adhering the lid material to the polymeric film, thereby encapsulating the product and forming the peel-open package. The sealed package 10 may then be cut longitudinally and/or transversely to form individual container shapes which correspond to the shape of the packaged product 25.

If the polymeric film 15 is to be used as a bag, all but one of the non-folded edges of the bag are typically sealed to one another, such as by applying heat and pressure. The lid 20 is adhered to the film 15 by applying a heat and pressure activated seal 30 to a continuous portion of the film and generally adjacent to a peripheral edge 35 of the film. Nevertheless, although the seal is continuous it is not complete and an open edge remains and provides an opening for positioning a product 25 therein. Once the product has been inserted into the bag, the lid material 20 is sealed to the remaining open edge of the film 15. The lid 20 therefore generally covers only a small portion of the polymeric film 15 to encapsulate the product 25 between the lid and film 15.

If the polymeric film 15 is to be used as a pouch, the lid 20 may be applied and at least a portion of the polymeric film is heated and pressure is applied along a continuous portion of the film to activate a seal 30 generally adjacent to a peripheral edge of the polymeric film to form a pocket, thereby allowing a product to be positioned therein. The seal 30 although continuous, is not complete, thereby providing a pocket for positioning a product 25 between the lid 20 and film 15. Once the product 25 is positioned, heat and pressure are applied to seal the lid 20 to the film 15 to complete the seal 30 and encapsulate the product 25.

As described above, one of the benefits of the sealable layer of the invention is its broad heat seal range and seal strength when used with uncoated Tyvek®. The heat seal can be formed by maintaining the polymeric film 15 at a temperature of between about 80° C. and 135° C. and a pressure of between about 20 and 60 psi for a period of between about 0.5 and 2.0 seconds. At temperatures below 80° C., the sealable layer generally will not melt to form the desired seal. Alternatively, at temperatures exceeding 135° C., the Tyvek® lid material will begin to melt thus affecting its microporosity and possibly causing the Tyvek® to adhere to the equipment used in the process. Preferably, the seal 30 can be formed by maintaining the polymeric film 15 at a temperature of between about 80° C. and 130° C. and a pressure of between about 30 and 50 psi for a period of between about 0.5 and 2.0 seconds. As would be understood by one skilled in the art, the temperature range is dependent on the vinyl acetate and methylacrylate content in the ethylene copolymer such that the melting point of the ethylene copolymer decreases with increased vinyl acetate or methylacrylate content. Therefore, an EVA copolymer derived from 4% VA monomer might require higher temperature ranges than an EVA copolymer derived from 15% VA monomer.

The polymeric films 15 of the invention have a thickness of between 2 and 20 mil. Typically, the approximate thickness of the sealable layer is between about 5 and 25 percent of the thickness of the polymeric film.

The resulting seal 30 has a mean seal strength between the lid 20 and the polymeric film 15 of between about 0.50 lbs/in and 4.00 lbs/in. The seal strength is measured using ASTM test method F-88 at a seal temperature of between about 122° C. and 132° C., a direct time of about 1.25 seconds, a pressure of about 40 psi, and a cross head speed of 12 in/min at a 90° peel angle with a supported tail. The seal strength ranges are important because a seal strength below 0.50 lbs/in may result in a heat seal 30 which fails to maintain a permanent and complete bond between the lid 20 and polymeric film 15 until it is ultimately opened. Alternatively, if the seal strength is greater than about 4.00 lbs/in, the seal 30 is too strong between the lid 20 and the polymeric film 15 and the lid cannot be easily removed from the polymeric film without resulting in delaminating or branching of the lid material.

Once the heat seal has been formed, the object within the package may then be sterilized by exposing the package to a sterilizing medium. The preferred sterilizing medium is ethylene oxide (ETO) but similar chemicals which can effectively sterilize the packaged object 20 may also be used. Alternatively, radiation such as gamma radiation may be used to sterilize the packaged object. When using ETO sterilization, the peel-open package 10 generally should be capable of withstanding the temperatures (up to 60° C.) and the high humidity associated with this method. In addition, as stated above, it is important that the lid 20 be microporous to allow the sterilization medium to pass into and out of the package 10 in order to sterilize the packaged product 25. The microporous lid 20 prevents the future contamination of the packaged object by bacteria and other microbial organisms.

The present invention will be further illustrated by the following non-limiting examples.

EXAMPLE 1

The thermoplastic polymeric film was a three layer blown coextruded film of a total gauge of 4 mil with the thicknesses of the individual layers being 1.12 mil for the outside layer, 2.48 mil for the core layer, and 0.4 mil for the heat seal layer. The outside layer consisted of an ethylene propylene (EP) copolymer and the core layer consisted of a dry blend of 80% polyethylene and 20% ionomer. The sealable layer consisted of 75% EVA (4% VA), 5% talc and 20% polybutylene. The film was produced on a three extruder-blown line using a blow up ratio of 1:1.46, a die size of 14 in., a line speed of 58 feet/minute (420 pounds/hour) and an air ring setting of 52 psi. This film was thermoformed and sealed on the form fill seal machine to uncoated Tyvek® (grade: 1059) under the following conditions (no product was applied and the blister pack remained empty):

Forming conditions:
The forming die size; 7 in. by 3.5 in. with a depth of 1.625 in.
Form temperature: 108° C.
Form dwell time: 1.5 seconds
Form pressure: 20 psi
Seal conditions:
Seal temperature: 128° C.
Seal dwell time: 1.25 seconds
Seal pressure: 43 psi
Seal width: 0.1875 in.

The heat seal layer was in contact with the uncoated Tyvek® when the two webs were sealed together. The seal strength was determined on the Instron using the ASTM F-88 test method by peeling down the pack in the machine direction. Accordingly, the uncoated Tyvek® was placed in the top jaws of the Instron and the polymeric film was placed in the bottom jaws of the Instron. Using a cross head speed of 12 in./min. the two webs were peeled away from each other at a 90° peel angle with a supported tail, for 1.5 in. in length. No fibre tear of the Tyvek®, Tyvek® delamination or stringing of the thermoplastic film was observed. The width of the seal was 0.1875 in. The final mean peel result was quoted in the standard units of lb/in., so the Instron was set up to automatically convert lb/0.1875 in. to lb/in. The seal strength recorded from the above seal conditions and peel method used was the mean value of a sample size of 10 and was 1.16 lb/in.

EXAMPLE 2

A peel-open package was prepared and the seal strength tested as described in Example 1 except that the seal temperature was 122° C. The seal strength recorded was the mean value of a sample size of 10 and was 1.0 lb/in.

EXAMPLE 3

A peel-open package was prepared and the seal strength tested as described in Example 2 except that the seal temperature was 132° C. The seal strength recorded was the mean value of a sample size of 10 and was 1.44 lb/in.

Although the above description generally applies to form, fill and seal packaging for sterile applications, it will be understood that the invention is not limited thereto since modifications may be made by those skilled in the art, particularly in light of the foregoing description. Therefore, said modifications and embodiments are intended to be included within the spirit and scope of the following appended claims.

That which is claimed:

1. A peel-open package for encapsulating a product and that is particularly useful for sterile applications, said package comprising:
   a polymeric film having a sealable layer and at least one base layer, said sealable layer consisting essentially of (1) an ethylene copolymer derived from at least one monomer selected from the group consisting of vinyl acetate and alkylacrylates, (2) a talc additive for providing uniform separation of the lid and the polymeric film and evidence of the integrity of the heat seal, and (3) an additive for interrupting the sealability of the ethylene copolymer to the lid to provide peelability to the heat seal, said peelability additive being selected from the group consisting of polybutylene, polypropylene, polyterpene, polystyrene, and styrene-butadiene copolymers; and
   a spunbonded nonwoven polyolefin web adhered to the sealable layer of said film along a continuous portion thereof for encapsulating a product therebetween.

2. The peel-open package according to claim wherein said spunbonded nonwoven Polyolefin web is adhered to said sealable layer by a heat and pressure activated seal.

3. The peel-open package according to claim 2 wherein said heat and pressure activated seal is generally adjacent to a peripheral edge of said film.

4. The peel-open package according to claim 2 wherein said seal has a seal strength between said spunbonded nonwoven polvolefin web and said sealable layer of between about 0.50 lbs/in and 4.00 lbs/in.

5. The peel-open package according to claim 1 wherein said ethylene copolymer in said sealable layer is derived from between about 2 and 20 percent by weight of said at least one monomer selected from the group consisting of vinyl acetate and alkylacrylates.

6. The peel-open package according to claim 1 wherein said sealable layer consists essentially of:
   between about 45 and 95 percent by weight of said ethylene copolymer;
   from greater than 0 to about 30 percent by weight of talc; and
   between about 5 and 40 percent by weight of said peelability additive.

7. The peel-open package according to claim 1 wherein said sealable layer consists essentially of:
   between about 70 and 80 percent by weight of said ethylene copolymer; between about 1 and 10 percent by weight of talc; and
   between about 15 and 25 percent by weight of said peelability additive.

8. The peel-open package according to claim 1 wherein said spunbonded nonwoven polyolefin web is uncoated.

9. The peel-open package according to claim 1 wherein said peelability additive is polybutylene.

10. The peel-open package according to claim 1 wherein said at least one base layer is selected from the group consisting of polyolefins, nylons, polyvinylidene chloride, vinylidene chloride copolymers (e.g. saran), ethylene vinyl acetate (EVA) copolymer, ionomers, hydrolyzed EVA copolymer (EVOH), ethylene alkyl acrylate copolymers, and blends thereof.

11. The peel-open package according to claim 1 wherein said ethylene copolymer is derived from at least one monomer selected from the group consisting of vinyl acetate and methylacrylate.

12. A peel-open package for sterilization of an object inside said package, said package comprising:

a polymeric film having a sealable layer and at least one base layer, said sealable layer consisting essentially of an ethylene copolymer derived from at least one monomer selected from the group consisting of vinyl acetate and alkylacrylates, a talc additive and an additive for providing peelability to the sealable layer; and a microporous material adhered to the sealable layer of said film along a continuous portion thereof by a heat and pressure activated seal for encapsulating a product therebetween.

13. The peel-open package according to claim 12 wherein said microporous material is an uncoated nonwoven spun-bonded polyolefin.

14. The peel-open package according to claim 12 wherein said heat and pressure activated seal is generally adjacent to a peripheral edge of said film.

15. The peel-open package according to claim 12 wherein said film is formed into a container shape selected from the group consisting of a pack and a tray.

16. The peel-open package according to claim 12 wherein said film is a flat film.

17. The peel-open package according to claim 12 wherein said seal has a seal strength between said microporous material and said polymeric film of between about 0.50 lbs/in and 4.00 lbs/in.

18. The peel-open package according to claim 12, wherein said ethylene copolymer in said sealable layer is derived from between about 2 and 20 percent by weight of said at least one monomer selected from the group consisting of vinyl acetate and alkylacrylates.

19. The peel-open package according to claim 12 wherein said sealable layer consists essentially of:

between about 45 and 95 percent by weight of said ethylene copolymer;

between greater than 0 to about 30 percent by weight of talc; and between about 5 and 40 percent by weight of said peelability additive.

20. The peel-open package according to claim 12 wherein said ethylene copolymer is derived from at least one monomer selected from the group consisting of vinyl acetate and methylacrylate.

* * * * *

UNITED STATES PATENT AND TRADEMARK OFFICE
CERTIFICATE OF CORRECTION

PATENT NO. : 5,830,547

DATED : November 3, 1998

INVENTOR(S) : MacKenzie et al.

It is certified that error appears in the above-identified patent and that said Letters Patent is hereby corrected as shown below:

In the Abstract, line 15, "Tinting" should read --linting--.

Column 10, line 21, "claim" should read --claim 1--; line 22, "Polyolefin" should read --polyolefin--; line 29, "polvolefin" should read --polyolefin--.

Signed and Sealed this

Sixteenth Day of March, 1999

*Attest:*

Q. TODD DICKINSON

*Attesting Officer*      *Acting Commissioner of Patents and Trademarks*